(12) United States Patent
Miyake et al.

(10) Patent No.: US 12,286,086 B2
(45) Date of Patent: Apr. 29, 2025

(54) CONTROL DEVICE, CONTROL SYSTEM, AND CONTROL METHOD

(71) Applicant: TOYOTA JIDOSHA KABUSHIKI KAISHA, Toyota (JP)

(72) Inventors: Kazuki Miyake, Okazaki (JP); Wataru Kanda, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 216 days.

(21) Appl. No.: 18/140,249

(22) Filed: Apr. 27, 2023

(65) Prior Publication Data
US 2023/0382358 A1 Nov. 30, 2023

(30) Foreign Application Priority Data
May 26, 2022 (JP) ................. 2022-086008

(51) Int. Cl.
*B60T 8/172* (2006.01)
*B60T 7/02* (2006.01)

(52) U.S. Cl.
CPC ............... *B60T 8/172* (2013.01); *B60T 7/02* (2013.01); *B60T 2201/03* (2013.01); *B60T 2220/06* (2013.01)

(58) Field of Classification Search
CPC ........ B60T 8/172; B60T 7/02; B60T 2201/03; B60T 2220/06; B60T 8/4081; B60T 13/146; B60T 2201/02; B60T 2220/03; B60T 2220/04; B60T 2260/08; B60T 2270/206; B60T 2270/413; B60T 7/12; B60T 13/662; B60T 13/74; B60T 17/18; B60T 7/042; B60W 30/18; B60W 10/04; B60W 10/184; B60W 30/14; B60W 2540/10; B60W 2540/14; B60W 2540/16
See application file for complete search history.

(56) References Cited

U.S. PATENT DOCUMENTS

2020/0070849 A1    3/2020  Suzuki et al.
2021/0394773 A1*  12/2021  Tanaka .................. B60W 50/12

FOREIGN PATENT DOCUMENTS

JP    2011-189891 A    9/2011
JP    2015-145155 A    8/2015
JP    2020-032894 A    3/2020

* cited by examiner

Primary Examiner — Xiao En Mo
(74) Attorney, Agent, or Firm — Oliff PLC (57) ABSTRACT

A control device configured to control motion of a vehicle includes a controller. The controller is configured to execute braking control that generates a braking force for decelerating the vehicle in response to a braking request. The controller is configured to release the braking force by the braking control when a predetermined condition for continuing the braking control is not satisfied, and to maintain the braking force by the braking control when the predetermined condition is satisfied, in a case where an accelerator pedal is operated during execution of the braking control.

6 Claims, 9 Drawing Sheets

CONTROL DEVICE, CONTROL SYSTEM, AND CONTROL METHOD

CROSS-REFERENCE TO RELATED APPLICATION

This application claims priority to Japanese Patent Application No. 2022-086008 filed on May 26, 2022, incorporated herein by reference in its entirety.

BACKGROUND

1. Technical Field

The present disclosure relates to a control device, a control system, and a control method.

2. Description of Related Art

There exists a motion manager that manages motion of a vehicle (see, for example, Japanese Unexamined Patent Application Publication No. 2020-032894). In a system including this motion manager, when a request from a driver assistance application has a higher priority than a driver's accelerator pedal operation, a power train controller rejects requested acceleration based on the accelerator pedal operation.

SUMMARY

When the driver operates the accelerator during a braking request by a driver assistance application, such as an adaptive cruise control (ACC), a state in which both deceleration and acceleration are requested (a so-called "double depression state") occurs. In the double depression state, the braking request is normally rejected. On the other hand, when considering a unique driver operation (for example, blipping during downshifting and double clutching) of a manual transmission vehicle (hereinafter, referred to as an "MT vehicle"), the driver may operate the accelerator without intending to accelerate during the deceleration. In such a case, the braking request is rejected by the driver's accelerator operation and a loss of a braking force occurs.

The present disclosure provides a control device, a control system, a control method, a non-transitory storage medium, and a vehicle that can prevent a loss of a braking force unintended by a driver, even when a double depression state occurs due to an unintended accelerator operation unique to an MT vehicle during a braking request.

A control device according to a first aspect of the present disclosure is configured to control motion of a vehicle. The control device includes a controller. The controller is configured to execute braking control that generates a braking force for decelerating the vehicle in response to a braking request, and to release the braking force by the braking control when a predetermined condition for continuing the braking control is not satisfied, and to maintain the braking force by the braking control when the predetermined condition is satisfied, in a case where an accelerator pedal is operated during execution of the braking control.

With such a configuration, in the case where the accelerator pedal is operated during the execution of the braking control in response to the braking request and when the predetermined condition for continuing the braking control is not satisfied, the braking force by the braking control is released, and, when the condition is satisfied, the braking force by the braking control is maintained. As a result, even when the double depression state occurs due to the unintended accelerator operation unique to the MT vehicle during the braking request, it is possible to provide the control device that can prevent a loss of the braking force unintended by the driver.

In the first aspect, the controller may be configured to release the braking force by the braking control by rejecting the braking request. With such a configuration, it is possible to release the braking force by a simple method of rejecting the braking request.

In the first aspect, the braking request may be a braking request from an instruction device. With such a configuration, even when the braking request is issued from the instruction device, it is possible to prevent the loss of the braking force unintended by the driver.

In the first aspect, the predetermined condition may be a condition in which a clutch pedal is operated or a condition in which a shift lever is positioned in a neutral position.

With such a configuration, in the case where the accelerator pedal is operated during the execution of the braking control in response to the braking request and when the condition of the clutch pedal being operated or the condition of the shift lever being positioned in the neutral position is not satisfied, the braking force by the braking control is released, and, when at least one of the conditions is satisfied, the braking force by the braking control is maintained. As a result, even when the double depression state occurs due to an unintended accelerator operation unique to an MT vehicle during the braking request, it is possible to prevent the loss of the braking force unintended by the driver.

A control system according to a second aspect of the present disclosure includes a control device including a first controller and configured to control motion of a vehicle, and an instruction device including a second controller configured to output a control request to the control device. The first controller is configured to execute braking control that generates a braking force for decelerating the vehicle in response to a braking request from the second controller, and to release the braking force by the braking control when a predetermined condition for continuing the braking control is not satisfied, and to maintain the braking force by the braking control when the predetermined condition is satisfied, in a case where an accelerator pedal is operated during execution of the braking control.

With such a configuration, it is possible to provide a control system that can prevent a loss of a braking force unintended by a driver, even when a double depression state occurs due to an unintended accelerator operation unique to an MT vehicle during a braking request.

A third aspect of the present disclosure is a control method by a control device configured to control motion of a vehicle and including a controller. The control method includes executing, by the controller, braking control that generates a braking force for decelerating the vehicle in response to a braking request, and releasing, by the controller, the braking force by the braking control when a predetermined condition for continuing the braking control is not satisfied, and maintaining, by the controller, the braking force by the braking control when the predetermined condition is satisfied, in a case where an accelerator pedal is operated during execution of the braking control.

With such a configuration, it is possible to provide a control method that can prevent a loss of a braking force unintended by a driver, even when a double depression state occurs due to an unintended accelerator operation unique to an MT vehicle during a braking request.

With each aspect of the present disclosure, it is possible to provide a control device, a control system, a control method, a non-transitory storage medium, and a vehicle that can prevent a loss of a braking force unintended by a driver, even when a double depression state occurs due to an unintended accelerator operation unique to an MT vehicle during a braking request.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A fourth aspect of the present disclosure is a non-transitory storage medium storing instructions that are executable by a control device configured to control motion of a vehicle and including a controller. The instructions cause the controller to execute the following functions. The functions include executing braking control that generates a braking force for decelerating the vehicle in response to a braking request, and releasing the braking force by the braking control when a predetermined condition for continuing the braking control is not satisfied, and maintaining the braking force by the braking control when the predetermined condition is satisfied, in a case where an accelerator pedal is operated during execution of the braking control.

With such a configuration, it is possible to provide a non-transitory storage medium storing instructions that cause functions to be executed that can prevent a loss of a braking force unintended by a driver, even when a double depression state occurs due to an unintended accelerator operation unique to an MT vehicle during a braking request.

A vehicle according to a fifth aspect of the present disclosure includes a control device including a first controller and configured to control motion of the vehicle, and an instruction device including a second controller configured to output a control request to the control device. The first controller is configured to execute braking control that generates a braking force for decelerating the vehicle in response to a braking request from the second controller, and to release the braking force by the braking control when a predetermined condition for continuing the braking control is not satisfied, and to maintain the braking force by the braking control when the predetermined condition is satisfied, in a case where an accelerator pedal is operated during execution of the braking control.

With such a configuration, it is possible to provide a vehicle that can prevent a loss of a braking force unintended by a driver, even when a double depression state occurs due to an unintended accelerator operation unique to an MT vehicle during the braking request.

Hereinbelow, embodiments of the present disclosure will be described with reference to the drawings. In the following description, the same parts are denoted by the same reference signs. Their names and functions are also the same. Therefore, a detailed description thereof will not be repeated.

Figure 1:
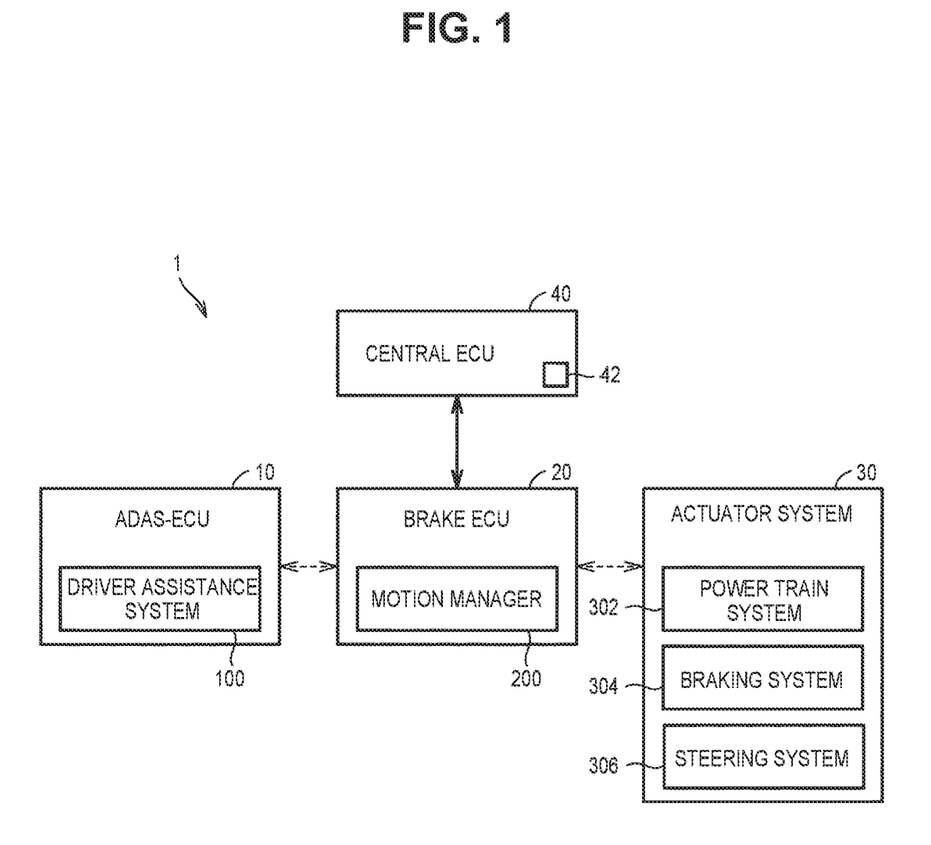
FIG. 1 is a diagram illustrating an example of a configuration of a vehicle.

FIG. 1 is a diagram illustrating an example of a configuration of a vehicle 1. As illustrated in FIG. 1, the vehicle 1 includes an advanced driver assistance system—electronic control unit (ADAS-ECU) 10, a brake ECU 20, an actuator system 30, and a central ECU 40.

The vehicle 1 is a vehicle having a configuration capable of realizing functions of a driver assistance system described below. For example, it may be a vehicle using an engine as a drive source, a battery electric vehicle using an electric motor as a drive source, or a hybrid electric vehicle having an engine and an electric motor mounted thereon and using at least one of an engine or an electric motor as a drive source.

The ADAS-ECU 10, the brake ECU 20, and the central ECU 40 are all computers respectively having processors, such as central processing units (CPU) that execute programs, memories, and input/output interfaces.

The ADAS-ECU 10 includes a driver assistance system 100 having functions associated with driver assistance of the vehicle 1. The driver assistance system 100 is configured to realize various functions for assisting driving of the vehicle 1 including at least one of steering control, driving control, and braking control of the vehicle 1 by executing an application embedded therein. An example of an application embedded in the driver assistance system 100 includes an application that realizes functions of an autonomous driving system (ADS), an application that realizes functions of an autonomous parking system, or an application (hereinafter referred to as ADAS application) that realizes functions of an advanced driver assistance system (hereinafter, referred to as ADAS).

The ADAS application includes at least one of an application that realizes a function of following a preceding vehicle (adaptive cruise control (ACC) and the like) while constantly keeping a distance between the vehicle and the preceding vehicle, an application that realizes a function of an auto speed limiter (ASL) that recognizes a velocity limit of a vehicle and maintains an upper velocity limit of the vehicle, an application that realizes a function of lane-keeping assistance (lane keeping assist (LKA), lane tracing assist (LTA), and the like) that enables the vehicle to stay in a traveling lane, an application that realizes a function of collision damage mitigation braking (autonomous emergency braking, AEB) or pre-crash safety (PCS) that autonomously applies braking to reduce collision damage, an application that realizes a function of lane deviation warning (a lane departure warning (LDW), a lane departure alert (LDA), or the like) that warns of the vehicle 1 deviating from a traveling lane, and the like.

Each of the applications of the driver assistance system 100 outputs, based on, for example, vehicle information on a vehicle surrounding situation acquired (input) from a plurality of sensors (not shown) or an assistance request of the driver, a kinematic plan request that guarantees commerciality (functionality) of each application to the brake ECU 20 (specifically, the motion manager 200). The sensors include, for example, a vision sensor, such as a front-facing camera, radar, Light Detection and Ranging (LiDAR), or a position detection device. Each application of the driver assistance system 100 is an example of a second controller in the present disclosure.

The front-facing camera is arranged on, for example, the back side of a rear-view mirror in the vehicle cabin, and is used to capture an image in front of the vehicle. A radar is a distance measuring device that irradiates an object with short-wave radio waves, detects the radio waves returned from the object, and measures the distance and direction to the object. LiDAR is a distance measurement device that measures a distance by irradiating pulsed laser light (light, such as infrared light), reflecting it off an object, and returning it. The position detection device may be, for example, a global positioning system (GPS) that detects the position of the vehicle 1 using information received from a plurality of satellites orbiting the earth.

Each application acquires the vehicle surroundings information that integrates the detection results of one or more sensors as recognition sensor information, and acquires a driver assistance request via a user interface (not shown), such as a switch. Each application, for example, can recognize other vehicles, obstacles, or people around the vehicle by image processing using artificial intelligence (AI) and image processing processors for images and videos around the vehicle acquired by the sensors.

Further, the kinematic plan includes, for example, a request regarding longitudinal acceleration/deceleration generated in the vehicle 1, a request regarding a steering angle of the vehicle 1, or a request regarding holding the vehicle 1 at a stop.

The requests regarding longitudinal acceleration/deceleration generated in vehicle 1 include, for example, an operation request for the power train system 302 and an operation request for the braking system 304.

The requests regarding holding the vehicle 1 at a stop includes, for example, a request regarding permitting and prohibiting an operation of at least one of an electric parking brake and a parking lock mechanism (neither shown).

The electric parking brake limits rotation of the wheels of the vehicle 1, for example, by an operation of an actuator. The electric parking brake may be configured to, for example, limit the rotation of the wheels by operating a brake for a parking brake provided on part of a plurality of wheels provided on the vehicle 1 using an actuator. Alternatively, the electric parking brake may operate the actuator for the parking brake, arbitrate the hydraulic pressure (hereinafter, sometimes referred to as the brake hydraulic pressure) supplied to the braking device of the braking system 304, limit the rotation of the wheels by operating the braking device, and brake the wheels during the rotation or hold the wheels at a stop.

The parking lock mechanism limits the rotation of an output shaft of a transmission by operating the actuator. The parking lock mechanism includes, for example, a protrusion provided at the tip of a parking lock pole of which a position is arbitrated by an actuator with respect to teeth of a gear (a lock gear) provided in connection with a rotating element in the transmission of the vehicle 1. As such, the rotation of the output shaft of the transmission is limited and the rotation of the drive wheels is limited.

Applications embedded in the driver assistance system 100 are not particularly limited to the applications described above, and applications that embed other functions may be added, or existing applications may be omitted, and, in particular, the number of applications embedded is not limited.

Further, in the present embodiment, the ADAS-ECU 10 has been described as including the driver assistance system 100 configured by a plurality of applications, but for example, an ECU may be provided for each application. For example, the driver assistance system 100 may be configured by an ECU in which an application that embeds the function of the autonomous driving system is installed, an ECU in which an application that embeds the function of the autonomous parking system is installed, and an ECU in which the ADAS application is installed.

The brake ECU 20 includes the motion manager 200. In the present embodiment, the case where the brake ECU 20 has a hardware configuration including the motion manager 200 will be described as an example. However, the motion manager 200 may be provided as a single ECU separate from the brake ECU 20, or may be included in another ECU different from the brake ECU 20. The brake ECU 20 is configured to be communicable with each of the ADAS-ECU 10, various ECUs included in the actuator system 30, and the central ECU 40.

The motion manager 200 requests the actuator system 30 for motion of the vehicle 1 according to the kinematic plan set in at least one of the applications of the driver assistance system 100. A detailed configuration of the motion manager 200 will be described below.

The actuator system 30 is configured to realize a motion request of the vehicle 1 output from the motion manager 200. The actuator system 30 includes a plurality of actuators. FIG. 1 illustrates a case where the actuator system 30 includes, for example, the power train system 302, the braking system 304, and a steering system 306 as actuators. The number of actuators to be requested by the motion manager 200 is not limited to three as described above, and may be four or higher or two or lower.

The power train system 302 includes a power train capable of generating a driving force to the drive wheels of the vehicle 1 and an ECU (neither shown) that controls the operation of the power train. A power train includes, for example, at least one of an internal combustion engine, such as a gasoline engine or a diesel engine, a transmission including a gearbox or a differential, a motor generator that serves as a drive source, a power accumulation device that accumulates power supplied to the motor generator, a power conversion device that mutually converts power between the motor generator and the power accumulation device, and a power generation source, such as a fuel cell. The ECU that controls the operation of the power train controls the corresponding equipment to realize motion requests from the motion manager 200 to the corresponding equipment in the power train system 302.

The braking system 304 includes, for example, a plurality of braking devices provided for each wheel of the vehicle 1. The braking device includes, for example, a hydraulic brake, such as a disc brake that uses hydraulic pressure to generate braking force and holding force. The braking device may further include, for example, a motor generator that is connected to the wheels and generates regenerative torque. A braking operation of the vehicle 1 using the braking devices is controlled by the brake ECU 20. The brake ECU 20 is provided with, for example, a controller (not shown) for controlling the braking system 304 separate from the motion manager 200.

The steering system 306 includes, for example, a steering device capable of changing the steering angle of steered wheels (for example, front wheels) of the vehicle 1 and an ECU (neither shown) that controls the operation of the steering device. The steering device includes, for example, a steering wheel that changes the steering angle according to an amount of operation, and an electric power steering (EPS) that can arbitrate the steering angle by an actuator separate from the operation of the steering wheel. The ECU, which controls the operation of the steering system, controls the operation of the EPS actuators.

The central ECU 40 includes a memory 42 of which the content can be updated. The central ECU 40 may be, for example, configured to be communicable with the brake ECU 20, and is configured to be communicable with equipment (for example, a server) (not shown) outside the vehicle 1 via a communication module (not shown). Upon receiving update information from a server outside the vehicle 1, the central ECU 40 updates the information stored in the memory 42 using the received update information. Predetermined information is stored in the memory 42. The predetermined information includes, for example, information read from various ECUs when the system of the vehicle 1 is started.

In the present embodiment, the central ECU 40 has been described as reading the predetermined information from the various ECUs when the system of the vehicle 1 is started, but it may also have a function (a gateway function) of, for example, relaying communication between various ECUs.

Figure 2:
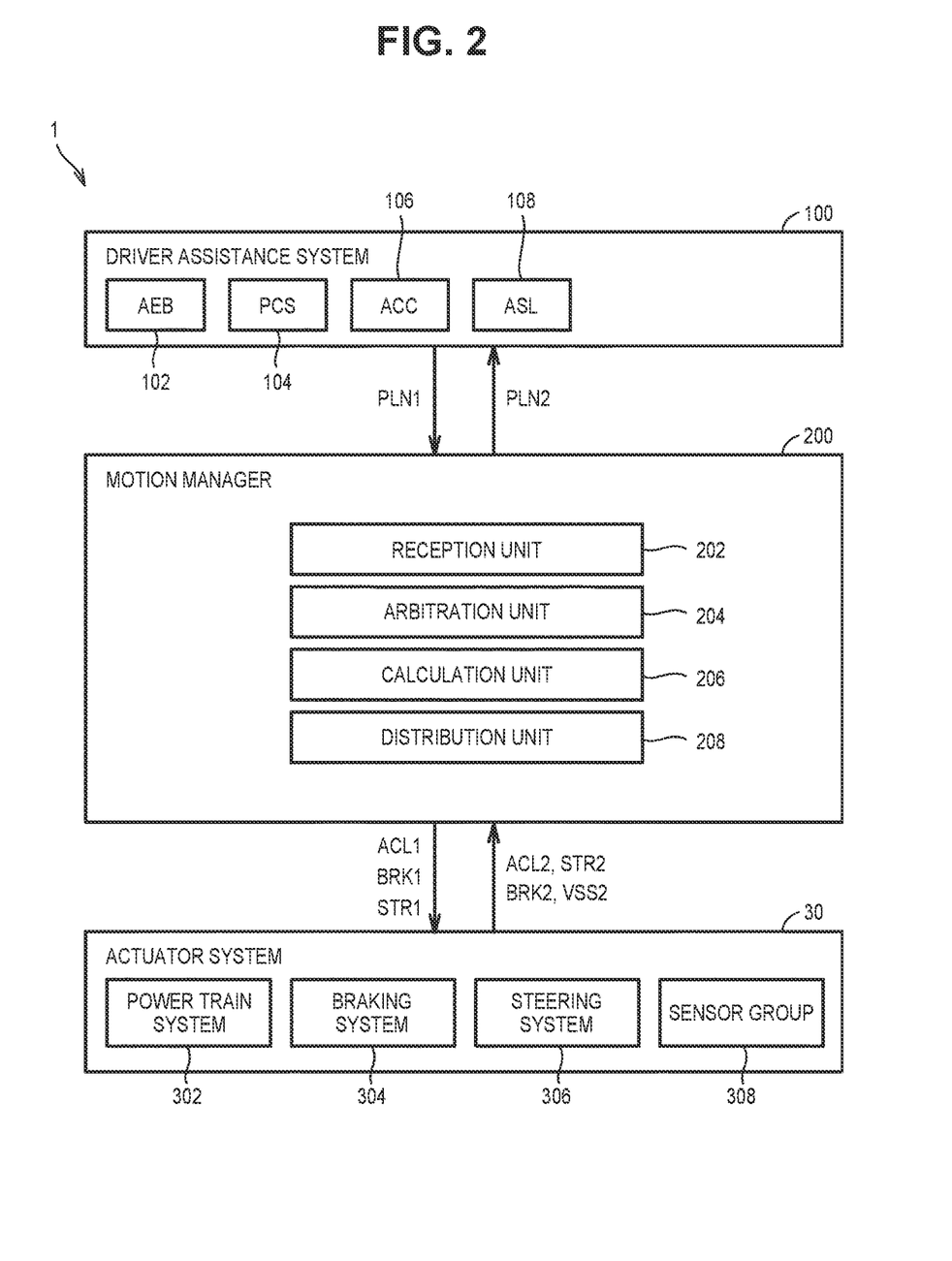
FIG. 2 is a diagram for describing an example of an operation of a motion manager.

Hereinbelow, an example of the operation of the motion manager 200 will be described in detail with reference to FIG. 2. FIG. 2 is a diagram for describing an example of an operation of the motion manager 200.

FIG. 2 illustrates a case where the driver assistance system 100 includes, for example, an AEB 102, a PCS 104, an ACC 106, and an ASL 108 as applications. A request for a kinematic plan set in at least one of the applications is transmitted from the driver assistance system 100 to the motion manager 200 as a request signal PLN 1.

The request signal PLN 1 includes, for example, information on a target acceleration set as one of the kinematic plans in the ACC 106, the AEB 102, the PCS 104, or the ASL 108. The target acceleration includes an acceleration value for driving or stopping the vehicle 1 as well as an acceleration value for keeping the vehicle 1 in a stopped state.

The motion manager 200 sets the motion requested of the vehicle 1 based on the kinematic plan request included in the received request signal PLN 1, and requests the actuator system 30 to realize the set motion. That is, the motion manager 200 transmits a request for an operation of the power train system 302 to the actuator system 30 as the request signal ACL 1. The motion manager 200 transmits a request for an operation of the braking system 304 to the actuator system 30 as the request signal BRK 1. Further, the motion manager 200 transmits a request for an operation of the steering system 306 to the actuator system 30 as the request signal STR 1.

The request signal ACL 1 includes, for example, information on the requested value of the driving torque or driving force, or information on how to arbitrate (for example, select a maximum or minimum value, whether to change step by step or change gradually, etc.).

The request signal BRK 1 includes, for example, information on the requested value of the braking torque, information on how to arbitrate (for example, whether to change step by step or change gradually), or information on a timing of braking (whether to immediately implement).

The request signal STR 1 includes, for example, a target steering angle, information on whether the target steering angle is valid, or information on upper and lower limits of the steering wheel operation assistance torque.

An actuator among the actuators constituting the actuator system 30 that receives the corresponding request signal is controlled so as to realize the operation request included in the request signal.

Hereinbelow, an example of the configuration of the motion manager 200 will be described. As illustrated in FIG. 2, the motion manager 200 includes a reception unit 202, an arbitration unit 204, a calculation unit 206, and a distribution unit 208.

The reception unit 202 receives a request for a kinematic plan output by one or more applications of the driver assistance system 100. Details of the kinematic plan in the present embodiment will be described below.

The arbitration unit 204 arbitrates requests for a plurality of kinematic plans received from each application via the reception unit 202. An example of this arbitration processing is to select one kinematic plan from the kinematic plans based on a predetermined selection criterion. Another example of the arbitration processing is to set a new kinematic plan based on the kinematic plans. The arbitration unit 204 may further add predetermined information received from the actuator system 30 to arbitrate requests for the kinematic plans. Further, the arbitration unit 204 determines whether to temporarily give priority to the motion of the vehicle 1 determined according to a driver state and a vehicle state over the motion of the vehicle 1 corresponding to the kinematic plan determined based on the arbitration result.

The calculation unit 206 calculates a motion request based on the result of the arbitration of the kinematic plan requests in the arbitration unit 204 and the motion of the vehicle 1 determined based on the arbitration result. This motion request is a physical quantity for controlling at least one actuator of the actuator system 30 and includes a physical quantity different from the physical quantity of the request of the kinematic plan. For example, when the request of the kinematic plan (a first request) is longitudinal acceleration, the calculation unit 206 calculates a value obtained by converting the acceleration into the driving force or driving torque as a motion request (a second request). For example, when the target acceleration for maintaining the stopped state is selected as the arbitration result, the calculation unit 206 calculates the requested driving force corresponding to the target acceleration.

The distribution unit 208 executes distribution processing for distributing the motion request calculated by the calculation unit 206 to at least one actuator of the actuator system 30. The distribution unit 208 distributes the motion request only to the power train system 302 when, for example, the acceleration of the vehicle 1 is requested. Alternatively, when deceleration of the vehicle 1 is requested, the distribution unit 208 appropriately distributes the motion request to the power train system 302 and the braking system 304 to achieve the target deceleration.

For example, when the target acceleration for maintaining the stopped state is selected as the arbitration result, the distribution unit 208 determines a holding force (for example, the brake hydraulic pressure) corresponding to the calculated driving force. In this case, the distribution unit 208 outputs the determined holding force to the braking system 304 as a motion request.

The power train system 302 of the actuator system 30 transmits information on the state of the power train system 302 to the motion manager 200 as the signal ACL 2. The information on the state of the power train system 302 includes, for example, information on the operation of the accelerator pedal, information on actual driving torque or a driving force of the power train system 302, information on an actual shift range, and the upper and lower limits of the driving torque, information on the upper and lower limits of the driving force, or information on the reliability of the power train system 302.

The braking system 304 of the actuator system 30 transmits information on the state of the braking system 304 to the motion manager 200 as the signal BRK 2. The information on the state of the braking system 304 includes, for example, information on the operation of the brake pedal, information on the braking torque requested by the driver, information on a requested value of the braking torque after the arbitration, information on the actual braking torque after the arbitration, information on a holding force after the arbitration, or information on the reliability of the braking system 304.

The steering system 306 of the actuator system 30 transmits information on the state of the steering system 306 to the motion manager 200 as the signal STR 2. The information on the state of the steering system 306 includes, for example, information on the reliability of the steering system 306, information on whether the driver is gripping the steering wheel, information on the torque for operating the steering wheel, or information on a rotation angle of the steering wheel.

Further, the actuator system 30 includes a sensor group 308 in addition to the power train system 302, the braking system 304, and the steering system 306 described above.

The sensor group 308 includes a plurality of sensors that detect behavior of the vehicle 1. The sensor group 308 includes, for example, a longitudinal G sensor that detects vehicle body acceleration in the longitudinal direction of the vehicle 1, a lateral G sensor that detects vehicle body acceleration in the lateral direction of the vehicle 1, a wheel velocity sensor provided on each wheel to detect wheel velocity, and a yaw rate sensor that detects angle velocity of the rotation angle (the yaw angle) in the yaw direction. The sensor group 308 transmits information including the detection results of the sensors to the motion manager 200 as the signal VSS 2. That is, the signal VSS 2 includes, for example, a detected value of the longitudinal G sensor, a detected value of the lateral G sensor, a detected value of the wheel velocity sensor of each wheel, a detected value of the yaw rate sensor, and information on the reliability of each sensor.

Upon receiving various signals from the actuator system 30, the motion manager 200 transmits predetermined information to the driver assistance system 100 as a signal PLN 2.

The configuration of the device mounted on the vehicle 1 and the configuration of the motion manager 200 described above are examples, and addition, replacement, change, omission, and the like can be made as appropriate. Further, the function of each device can be appropriately integrated into one device or distributed to a plurality of devices and executed.

In the vehicle 1 having such a configuration, when a request from an application, such as the ADAS application, has a higher priority than the driver's accelerator pedal operation, the power train system 302 rejects the requested acceleration based on the accelerator pedal operation.

However, when the driver operates the accelerator during the braking request by the ADAS application, such as the ACC 106, the state in which both deceleration and acceleration are requested (the so-called "double depression state") occurs. In the double depression state, the braking request is normally rejected. On the other hand, when considering a unique driver operation (for example, blipping during the downshifting and the double clutching) of the MT vehicle, the driver may operate the accelerator without intending to accelerate during the deceleration. In such a case, the braking request is rejected by the driver's accelerator operation and a loss of a braking force occurs.

Specifically, when the driver depresses the accelerator pedal during the deceleration by the driver assistance system 100 (for example, the ACC 106), the motion manager 200 of the brake ECU 20 determines that the driver intends to accelerate, and releases the deceleration.

Figure 3:
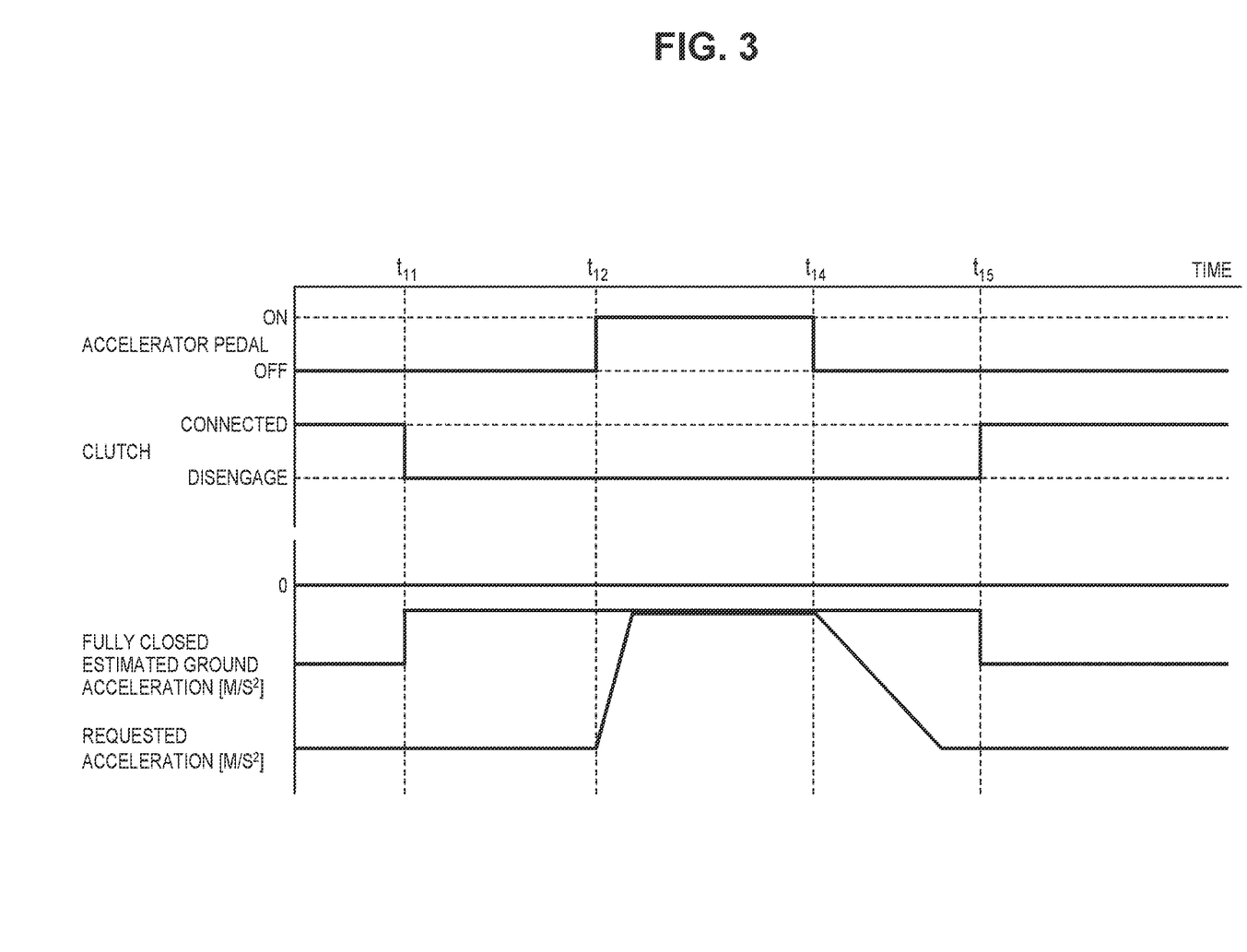
FIG. 3 is a diagram illustrating a timing chart for describing a shortcoming in this disclosure.

FIG. 3 is a diagram illustrating a timing chart for describing a shortcoming in this disclosure. With reference to FIG. 3, in the MT vehicle, when changing gears of the gearbox, while the clutch is disengaged from time t11, the driver may depress the accelerator pedal (turn on the accelerator pedal) at time t12 in order to match rotation speed of an engine side gear and a wheel side gear. Fully closed estimated ground acceleration is an estimated value of acceleration that the power train can output when the accelerator pedal is in the off state. When the clutch is disengaged, the engine brake becomes ineffective, so the fully closed estimated ground acceleration, which is the deceleration acceleration, decreases after time t11. When the deceleration acceleration indicated by a cruise request, which is an acceleration request of the vehicle 1, from the ACC 106, is smaller than the fully closed estimated ground acceleration, that is, when the braking control is required, when the driver has operated the accelerator, it is determined that the double depression state has occurred, and an instruction to generate the braking force by the motion manager 200 is released. For this reason, the requested acceleration (the requested deceleration) on the negative side of the motion manager 200 of the brake ECU 20, as illustrated in FIG. 3, is rapidly reduced to the fully closed estimated ground acceleration, which is an acceleration when the braking device does not operate, after time t12. As such, the deceleration acceleration is reduced while the driver expects the deceleration, so the driver may feel a sense of there being a loss of deceleration.

Thus, the CPU of the brake ECU 20 executes the braking control that generates the braking force for decelerating the vehicle 1 in response to the braking request and releases the braking force by the braking control when a predetermined condition for continuing the braking control is not satisfied, and maintains the braking force by the braking control when the predetermined condition is satisfied, in a case where the accelerator pedal is operated during the execution of the braking control.

As such, in the case where the accelerator pedal is operated during the execution of the braking control in response to the braking request and when the predetermined condition for continuing the braking control is not satisfied, the braking force by the braking control is released, and, when the predetermined condition is satisfied, the braking force by the braking control is maintained. As a result, even when the double depression state occurs due to the unintended accelerator operation unique to the MT vehicle during the braking request, it is possible to prevent the loss of the braking force unintended by the driver.

Figure 4:
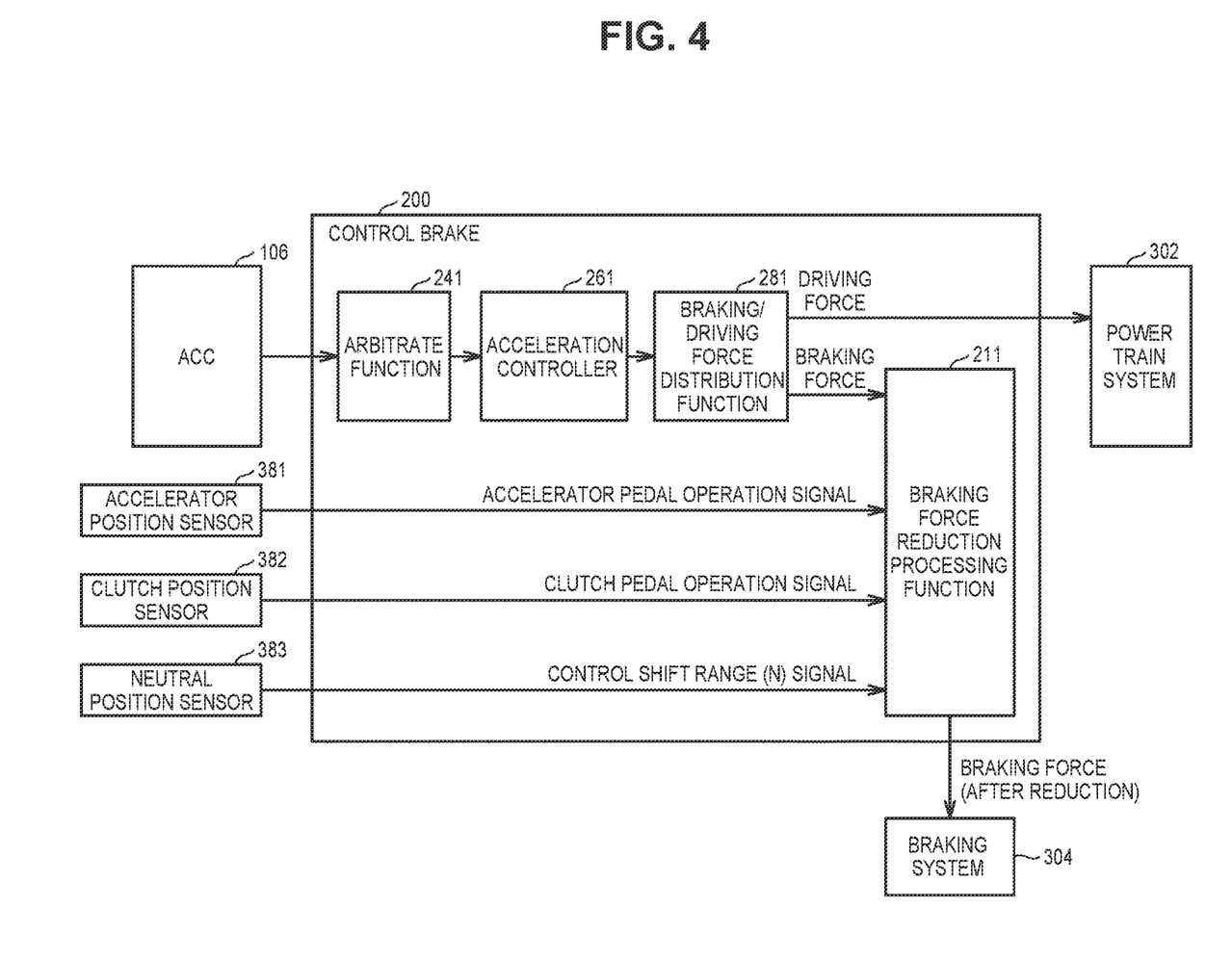
FIG. 4 is a control block diagram of an embodiment of this disclosure.

FIG. 4 is a control block diagram of an embodiment of this disclosure. With reference to FIG. 4, the ACC 106 gives a command value for accelerating the vehicle 1 to an arbitration function 241 of the arbitration unit 204 of the motion manager 200. The arbitration function 241 arbitrates an acceleration command from the ACC 106 and an acceleration command from another application of the driver assistance system 100, and gives the arbitrated acceleration command to the acceleration controller 261 of the calculation unit 206. This arbitration is executed according to, for example, the priority of the application of the driver assistance system 100. Specifically, the acceleration command from the application with the highest priority is decided as the acceleration command to be given to the acceleration controller 261.

The acceleration controller 261 calculates the driving force or the braking force capable of generating the acceleration indicated by the command given from the arbitration function 241, and gives the calculated driving force or braking force command to a braking/driving force distribution function 281 of the distribution unit 208. The braking/driving force distribution function 281 gives a command to generate the driving force indicated by the command from the acceleration controller 261 to the power train system 302, and gives a command indicating the braking force indicated by the command from the acceleration controller 261 to a braking force reduction processing function 211.

The sensor group 308 includes an accelerator position sensor 381, a clutch position sensor 382, and a neutral position sensor 383.

The accelerator position sensor 381 detects the amount of operation of the accelerator pedal, and outputs the signal indicating the detected amount of operation as an accelerator pedal operation signal indicating that the accelerator pedal has been operated to the braking force reduction processing function 211 of the motion manager 200.

The clutch position sensor 382 detects the amount of operation of the clutch pedal, and outputs the signal indicating the detected amount of operation as a clutch pedal operation signal indicating that the clutch pedal has been operated to the braking force reduction processing function 211.

The neutral position sensor 383 detects whether the shift position, which is the position of the shift lever, is in the neutral position, and outputs a signal indicating whether the detected neutral position is in place to the braking force reduction processing function 211 as a control shift range (N) signal indicating that the shift range being controlled is in the neutral position.

Using the accelerator pedal operation signal from the accelerator position sensor 381, the clutch operation signal from the clutch position sensor 382, and the control shift range (N) signal from the neutral position sensor 383, the braking force reduction processing function 211 determines whether to reduce the braking force indicated by the command from the braking/driving force distribution function 281. When it is determined that the braking force is not reduced, a command indicating the braking force indicated by the command from the braking/driving force distribution function 281 is given to the braking system 304. Alternatively, when it is determined that the braking force is reduced, a command to generate the braking force obtained by reducing the braking force indicated by the command from the braking/driving force distribution function 281 is given to the braking system 304.

Figure 5:
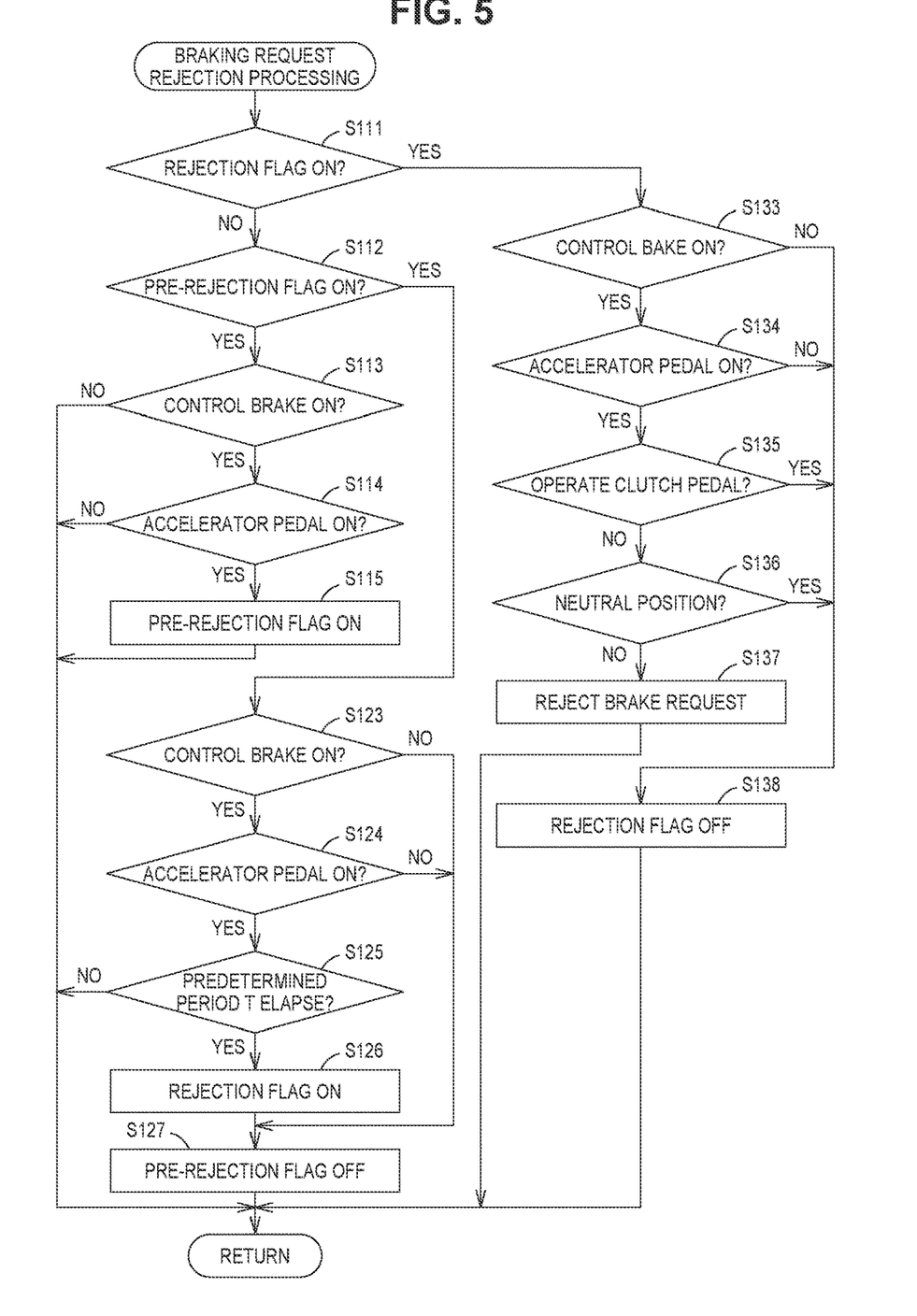
FIG. 5 is a flowchart illustrating a flow of braking request rejection processing of the embodiment of this disclosure.

FIG. 5 is a flowchart illustrating a flow of the braking request rejection processing of the embodiment of this disclosure. With reference to FIG. 5, this braking request rejection processing is processing executed as part of the braking force reduction processing function 211 among the functions of the motion manager 200 by the CPU of the brake ECU 20. This braking request rejection processing is called and executed at predetermined control cycles from higher-level processing.

The CPU of the brake ECU 20 determines whether a rejection flag is on (step S111). The rejection flag is a flag that indicates that rejection of the braking request is permitted when it is on, and rejection of the braking request is prohibited when it is off. The braking request is a request for the deceleration from an application of the driver assistance system 100, such as the ACC 106. The rejection of the braking request is a state where the function of the motion manager 200 by the CPU of the brake ECU 20 does not execute the braking in response to the braking request from the application of the driver assistance system 100, such as the ACC 106.

When it is determined that the rejection flag is not on (NO in step S111), the CPU of the brake ECU 20 determines whether a pre-rejection flag is on (step S112). When the pre-rejection flag is on, it indicates that it is the stage before the turning on of the rejection flag, and when the pre-rejection flag is off, it indicates that it is not the stage before the turning on of the rejection flag.

When it is determined that the pre-rejection flag is not on (NO in step S112), the CPU of the brake ECU 20 determines whether the control brake is on, that is, whether the control brake is generating the braking force (step S113). The control brake can be controlled by the brake ECU 20, such as a friction brake, an engine brake, a regenerative brake, and an exhaust brake.

When it is determined that the control brake is on (YES in step S113), the CPU of the brake ECU 20 determines whether the accelerator pedal is on, using the accelerator pedal operation signal from the accelerator position sensor 381 (step S114). When it is determined that the accelerator pedal is on (YES in step S114), the CPU of the brake ECU 20 turns on the pre-rejection flag (step S115).

In the case where it is determined that the control brake is not on (NO at step S113), when it is determined that the accelerator pedal is not on (NO at step S114), or after step S115, the CPU of the brake ECU 20 returns the processing to be executed to the higher-level processing that has called the braking request rejection processing.

When it is determined that the pre-rejection flag is on (YES in step S112), the CPU of the brake ECU 20 determines whether the control brake is on (step S123). When it is determined that the control brake is on (YES in step S123), the CPU of the brake ECU 20 determines whether the accelerator pedal is on, using the accelerator pedal operation signal from the accelerator position sensor 381 (step S124).

When it is determined that the accelerator pedal is on (YES in step S124), the CPU of the brake ECU 20 determines whether a predetermined period T has elapsed since the accelerator pedal has been on (step S125). When it is determined that the predetermined period T has elapsed (YES in step S125), the CPU of the brake ECU 20 turns on the rejection flag (step S126).

In a case where it is determined that the control brake is no longer on (NO at step S123), when it is determined that the accelerator pedal is no longer on (NO at step S124), or after step S126, the CPU of the brake ECU 20 turns off the pre-rejection flag (step S127).

When it is determined that the predetermined period T has not elapsed since the accelerator pedal has been turned on (NO at step S125), or after step S127, the CPU of the brake ECU 20 returns the processing to be executed to the higher-level processing that has called the braking request rejection processing.

When it is determined that the rejection flag is on (YES in step S111), the CPU of the brake ECU 20 determines whether the control brake is on (step S133). When it is determined that the control brake is on (YES in step S133), the CPU of the brake ECU 20 determines whether the accelerator pedal is on, using the accelerator pedal operation signal from the accelerator position sensor 381 (step S134).

When it is determined that the accelerator pedal is on (YES in step S134), the CPU of the brake ECU 20 determines whether the clutch pedal is operating, using the clutch pedal operation signal from the clutch position sensor 382 (step S135).

When it is determined that the clutch pedal is not operating (NO in step S135), the CPU of the brake ECU 20 determines whether the controlled shift range is in the neutral position, using the control shift range (N) signal from the neutral position sensor 383 (step S136).

When it is determined that the shift range is not in the neutral position (NO in step S136), the CPU of the brake ECU 20 rejects the braking request (step S137), and returns the processing to be executed to the processing that has called the braking request rejection processing.

When it is determined that the control brake is no longer on (NO in step S133), when it is determined that the accelerator pedal is no longer on (NO in step S134), when it is determined that the clutch pedal is operated (YES in step S135), or when it is determined that the shift range is in the neutral position (YES in step S136), the CPU of the brake ECU 20 turns off the rejection flag (step S138), and returns the processing to be executed to the processing that has called the braking request rejection processing. When the rejection flag is turned off, the process of step S137 is not executed and thus the braking request is not rejected.

Figure 6:
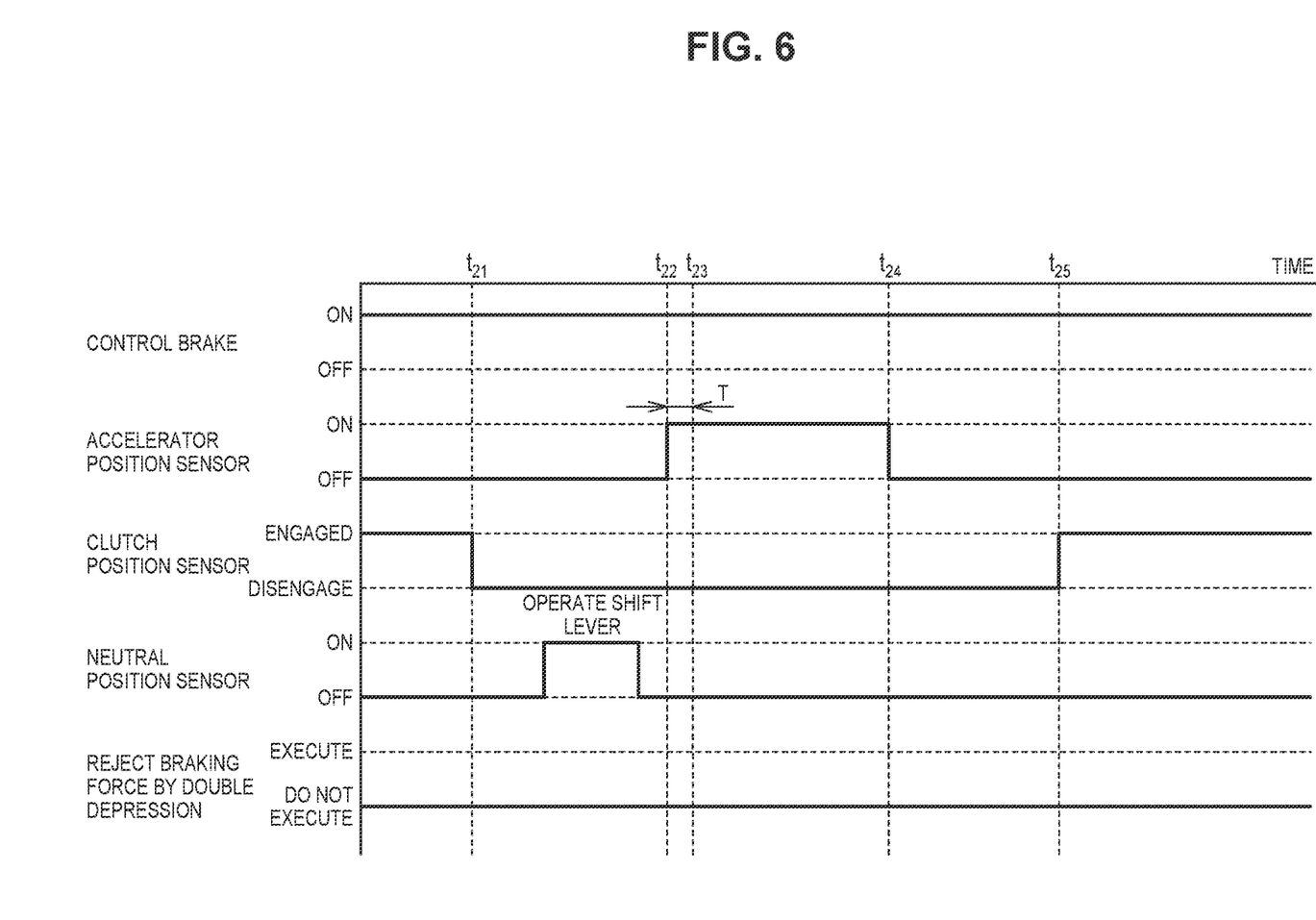
FIG. 6 is a diagram illustrating a first example of a timing chart when a braking request is not rejected in this embodiment.

FIG. 6 is a diagram illustrating a first example of a timing chart when the braking request is not rejected in this embodiment. This example is an example of the double depression state in a case of a single clutch operation, which is a normal operation without a special operation, such as blipping or a double clutching operation during the down-shifting. With reference to FIG. 6, while the control brake is on and the clutch is disengaged from time t21, by operating the shift lever for a shift change, the shift range is set to the neutral position during a period between time t21 and time t22. Thereafter, the accelerator pedal is on from time t22 to time t24. At time t25 thereafter, the clutch is engaged.

In this case, at time t22 when the double depression state begins, since the rejection flag and the pre-rejection flag are not on, negative determinations are made in steps S111 and S112 of FIG. 5. Further, since the control brake is on and the accelerator pedal is on, positive determinations are made in steps S113 and S114, and the pre-rejection flag is turned on in step S115.

Thereafter, when the pre-rejection flag remains on from time t22 to time t23, a positive determination is made in step S112, and when the control brake remains on and the accelerator pedal remains on, positive determinations are made in steps S123 and S124 and a negative determination is made in step S125 because the predetermined period T (=t23–t22) has not elapsed.

At time t23 in this state, the predetermined period T has elapsed since the accelerator pedal has been turned on and thus a positive determination is made in step S125, the rejection flag is turned on in step S126, and the pre-rejection flag is turned off in step S127.

Immediately after time t23, the rejection flag is on and thus a positive determination is made in step S111, but even when the control brake remains on, the accelerator pedal remains on, and positive determinations are made in steps S133 and S134, a positive determination is made in step S135 because the clutch pedal is being operated, and the rejection flag is turned off in step S138. As such, in the double depression state in the case of the single clutch operation as illustrated in FIG. 6, the control brake is on and the accelerator pedal is on, but the process of step S137 is not executed and thus the braking request is not rejected.

Figure 7:
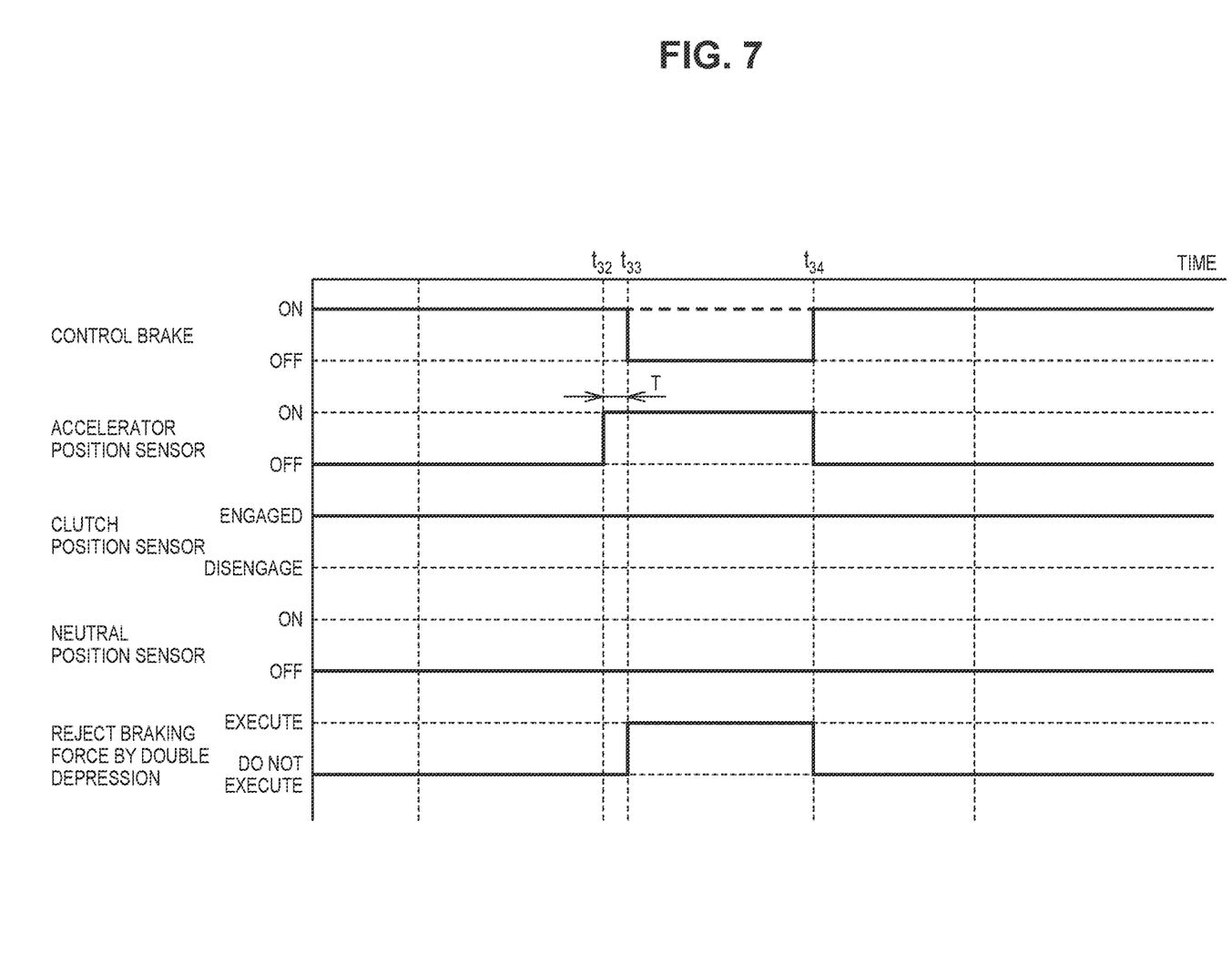
FIG. 7 is a diagram illustrating an example of the timing chart when a braking request is rejected in this embodiment.

FIG. 7 is a diagram illustrating an example of the timing chart when the braking request is rejected in this embodiment. This example is an example of a double depression state in a case where neither the clutch pedal nor the shift lever is operated. With reference to FIG. 7, when the control brake is on, the accelerator pedal is on from time t32 to time t34.

In this case, at time t32 when the double depression state begins, since the rejection flag and the pre-rejection flag are not on, negative determinations are made in steps S111 and S112 of FIG. 5. Further, since the control brake is on and the accelerator pedal is on, positive determinations are made in steps S113 and S114, and the pre-rejection flag is turned on in step S115.

Thereafter, when the pre-rejection flag remains on from time t32 to time t33, a positive determination is made in step S112, and when the control brake remains on and the accelerator pedal remains on, positive determinations are made in steps S123 and S124 and a negative determination is made in step S125 because the predetermined period T (=t33–t32) has not elapsed.

At time t33 in this state, the predetermined period T has elapsed since the accelerator pedal has been turned on and thus a positive determination is made in step S125, the rejection flag is turned on in step S126, and the pre-rejection flag is turned off in step S127.

From time t33 to time t34, the rejection flag is on, so the positive determination is made in step S111, the control brake remains on, and the accelerator pedal remains on, so positive determinations are made in steps S133 and S134, the clutch pedal is not operated, and the shift lever is not in the neutral position, so negative determinations are made in steps S135 and S136, and thus the braking request is rejected in step S137. As such, in the double depression state in the case where neither the clutch pedal nor the shift lever is operated, the braking request is rejected when the control brake is on, and the accelerator pedal is on.

Figure 8:
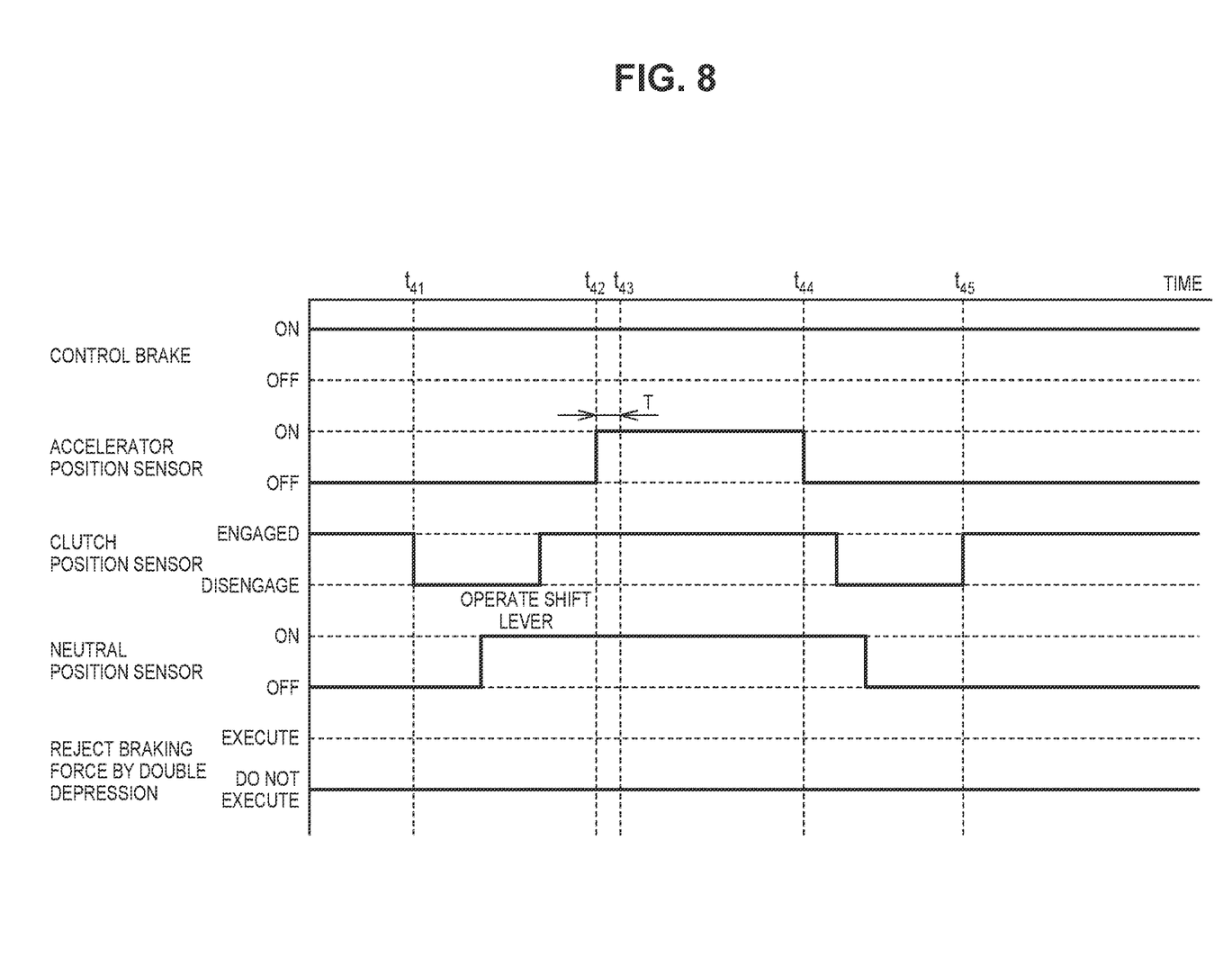
FIG. 8 is a diagram illustrating a second example of a timing chart when a braking request is not rejected in this embodiment.

FIG. 8 is a diagram illustrating a second example of the timing chart when the braking request is not rejected in this embodiment. This example is an example of the double depression state in a case of the double clutching operation. With reference to FIG. 8, while the control brake is on and the clutch is disengaged from time t41, by operating the shift lever for the shift change, the shift lever is set to the neutral position during a period within a time period from time t41. Thereafter, once, during the period between time t42 and time t44 during which the clutch is engaged, the accelerator pedal is on. Thereafter, the clutch is disengaged, the shift lever is shifted from the neutral position to one of the shift stages, and the clutch is engaged at time t45.

In this case, at time t42 when the double depression state begins, since the rejection flag and the pre-rejection flag are not on, negative determinations are made in steps S111 and S112 of FIG. 5. Further, since the control brake is on and the accelerator pedal is on, the positive determinations are made in steps S113 and S114, and the pre-rejection flag is turned on in step S115.

Thereafter, when the pre-rejection flag remains on from time t42 to time t43, a positive determination is made in step S112, and when the control brake remains on and the accelerator pedal remains on, positive determinations are made in steps S123 and S124 and a negative determination is made in step S125 because the predetermined period T (=t43−t42) has not elapsed.

At time t43 in this state, the predetermined period T has elapsed since the accelerator pedal has been turned on and thus a positive determination is made in step S125, the rejection flag is turned on in step S126, and the pre-rejection flag is turned off in step S127.

Immediately after time t43, the rejection flag is on and thus the positive determination is made in step S111, but even when the control brake remains on, the accelerator pedal remains on, and the positive determinations are made in steps S133 and S134, the positive determination is made in step S136 because the shift lever is in the neutral position, and the rejection flag is turned off in step S138. As such, in the double depression state in the case of the double clutching operation as illustrated in FIG. 8, the control brake is on and the accelerator pedal is on, but the process of step S137 is not executed and thus the braking request is not rejected.

Figure 9:
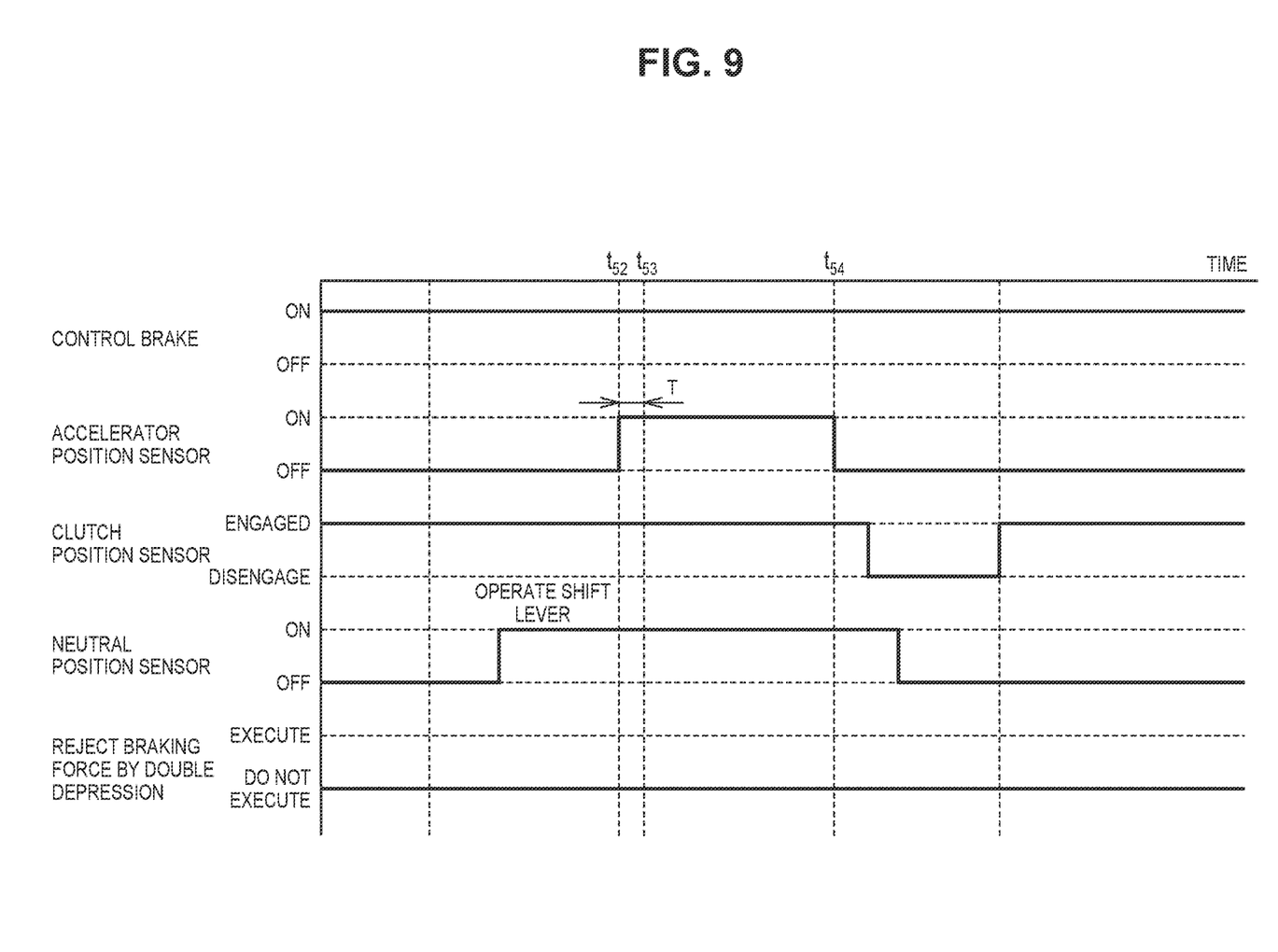
FIG. 9 is a diagram illustrating a third example of a timing chart when a braking request is not rejected in this embodiment.

FIG. 9 is a diagram illustrating a third example of the timing chart when the braking request is not rejected in this embodiment. This example is an example of the double depression state in a case where the shift lever is operated to the neutral position without operating the clutch. With reference to FIG. 9, the control brake is on, and before the accelerator pedal is turned on at time t52, the shift lever is moved to the neutral position while the clutch remains engaged. The accelerator pedal is on from time t52 to time t54. After time t54, the shift lever is shifted from the neutral position to one of the shift stages while the clutch is disengaged.

In this case, at time t52 when the double depression state begins, since the rejection flag and the pre-rejection flag are not on, negative determinations are made in steps S111 and S112 of FIG. 5. Further, since the control brake is on and the accelerator pedal is on, the positive determinations are made in steps S113 and S114, and the pre-rejection flag is turned on in step S115.

Thereafter, when the pre-rejection flag remains on from time t52 to time t53, a positive determination is made in step S112, and when the control brake remains on and the accelerator pedal remains on, positive determinations are made in steps S123 and S124 and a negative determination is made in step S125 because the predetermined period T (=t53−t52) has not elapsed.

At time t53 in this state, the predetermined period T has elapsed since the accelerator pedal has been turned on and thus a positive determination is made in step S125, the rejection flag is turned on in step S126, and the pre-rejection flag is turned off in step S127.

Immediately after time t53, the rejection flag is on and thus the positive determination is made in step S111, but even when the control brake remains on, the accelerator pedal remains on, and the positive determinations are made in steps S133 and S134, the positive determination is made in step S136 because the shift lever is in the neutral position, and the rejection flag is turned off in step S138. As such, in the double depression state in the case where shift lever is operated to move to the neutral position without a clutch operation, as illustrated in FIG. 9, the control brake is on and the accelerator pedal is on, but the process of step S137 is not executed and thus the braking request is not rejected.

MODIFIED EXAMPLES (1) In the above-described embodiment, as illustrated in steps S123 to S126 in FIG. 5, when a predetermined period has elapsed while the control brake remains on and the accelerator pedal remains on, the rejection flag is turned on regardless of the state of the clutch pedal or the shift position. However, the present disclosure is not limited thereto, and when the predetermined period has elapsed while the control brake remains on and the accelerator pedal remains on, in the case where the clutch pedal is not operated and the shift lever is not in the neutral position, the rejection flag may be turned on.

(2) In the above-described embodiment, as illustrated in FIG. 5, by turning on the pre-rejection flag in the period from beginning of the double depression state to the point at which the predetermined period T has elapsed, it is possible to detect the predetermined period T. However, a method different from the method using the flag, such as the pre-rejection flag, may be used as long as the method can detect the predetermined period T.

(3) In the above-described embodiment, as illustrated in FIG. 5, by turning on the rejection flag after the predetermined period T has elapsed since beginning of the double depression state, it is possible to detect that the predetermined period T has elapsed. However, a method different from the method using the flag, such as the rejection flag, may be used as long as the method can detect that the predetermined period T has elapsed.

(4) In the above-described embodiment, the control device that controls the motion of the vehicle 1 is the motion manager 200 of the brake ECU 20. However, the control device is not limited thereto, and may be another control device, such as a CPU of another ECU.

(5) In the above-described embodiment, the instruction device that issues the control request to the control device is the driver assistance system 100 of the ADAS-ECU 10. However, the instruction device is not limited thereto, and may be another instruction device, such as a CPU of another ECU.

(6) The above-described embodiment can be regarded as an example of a disclosure of a control device, such as the motion manager 200, which controls the motion of the vehicle 1, an example of a disclosure of a control system or a vehicle that includes the control device and the instruction device, such as the driver assistance system 100 that issues the control request to the control device, an example of a disclosure of a control method by the control device, or an example of a disclosure of a non-transitory storage medium storing instructions executed by the control device.

SUMMARY (1) As described with reference to FIGS. 1 and 2, the brake ECU 20 is the control device that controls the motion of the vehicle 1 and includes the CPU. As described with reference to FIGS. 1, 2, and 4, the CPU of the brake ECU 20 executes the braking control that generates the braking force for decelerating the vehicle in response to the braking request. As illustrated in FIGS. 4 to 9, when the accelerator pedal is operated during the execution of the braking control (for example, when positive determinations are made in steps S133 and S134 of FIG. 5) and when the predetermined condition for continuing the braking control is not satisfied (for example, when negative determinations are made in steps S135 and S136), the CPU of the brake ECU 20 releases the braking force by the braking control (for example, step S137 in FIG. 5). On the other hand, when the predetermined condition is satisfied (for example, when a positive determination is made in at least one of steps S135 and S136), the CPU of the brake ECU 20 maintains the braking force by the braking control (for example, step S138 of FIG. 5).

As such, in the case where the accelerator pedal is operated during the execution of the braking control in response to the braking request and when the predetermined condition for continuing the braking control is not satisfied, the braking force by the braking control is released, and, when the predetermined condition is satisfied, the braking force by the braking control is maintained. As a result, even when the double depression state occurs due to the unintended accelerator operation unique to the MT vehicle during the braking request, it is possible to prevent the loss of the braking force unintended by the driver. The CPU of the brake ECU 20 is an example of a "controller" and a "first controller" in the present disclosure.

(2) As illustrated in step S137 of FIG. 5, the CPU of the brake ECU 20 may release the braking force by the braking control by rejecting the braking request. As such, it is possible to release the braking force by the simple method of rejecting the braking request.

(3) As illustrated in FIG. 4, the braking request may be the braking request from the instruction device (for example, each application of the driver assistance system 100 of the ADAS-ECU 10). As such, even when the braking request is issued from the instruction device, it is possible to prevent the loss of the braking force unintended by the driver.

(4) As illustrated in steps S135 and S136 of FIG. 5, the predetermined condition may be the condition in which the clutch pedal is operated or the condition in which the shift lever is positioned in the neutral position.

As such, in the case where the accelerator pedal is operated during the execution of the braking control in response to the braking request and when the condition of the clutch pedal being operated or the condition of the shift lever being positioned in the neutral position is not satisfied, the braking force by the braking control is released, and, when at least one of the conditions is satisfied, the braking force by the braking control is maintained. As a result, even when the double depression state occurs due to the unintended accelerator operation unique to the MT vehicle during the braking request, it is possible to prevent the loss of the braking force unintended by the driver.

The embodiment disclosed herein is to be considered as illustrative in all points and not restrictive. The scope of the present disclosure is shown not by the above description of the embodiments but by the claims, and is intended to include meanings equivalent to the claims and all modifications within the scope thereof.

What is claimed is:

1. A control device configured to control motion of a vehicle, the control device comprising:
   a controller configured:
      to execute braking control that generates a braking force for decelerating the vehicle in response to a braking request; and
      to release the braking force by the braking control when a predetermined condition for continuing the braking control is not satisfied, and to maintain the braking force by the braking control when the predetermined condition is satisfied, in a case where an accelerator pedal is operated during execution of the braking control.

2. The control device according to claim 1, wherein the controller is configured to release the braking force by the braking control by rejecting the braking request.

3. The control device according to claim 1, wherein the braking request is a braking request from an instruction device.

4. The control device according to claim 1, wherein the predetermined condition is a condition in which a clutch pedal is operated or a condition in which a shift lever is positioned in a neutral position.

5. A control system comprising:
   a control device including a first controller and configured to control motion of a vehicle; and
   an instruction device including a second controller configured to output a control request to the control device, wherein:
   the first controller is configured:
      to execute braking control that generates a braking force for decelerating the vehicle in response to a braking request from the second controller; and
      to release the braking force by the braking control when a predetermined condition for continuing the braking control is not satisfied, and to maintain the braking force by the braking control when the predetermined condition is satisfied, in a case where an accelerator pedal is operated during execution of the braking control.

6. A control method by a control device configured to control motion of a vehicle and including a controller, the control method comprising:
   executing, by the controller, braking control that generates a braking force for decelerating the vehicle in response to a braking request; and
   releasing, by the controller, the braking force by the braking control when a predetermined condition for continuing the braking control is not satisfied, and maintaining, by the controller, the braking force by the braking control when the predetermined condition is satisfied, in a case where an accelerator pedal is operated during execution of the braking control.

* * * * *